(12) United States Patent
Wang et al.

(10) Patent No.: US 10,917,581 B2
(45) Date of Patent: Feb. 9, 2021

(54) OPTICAL MEASUREMENT SYSTEM WITH DYNAMIC EXPOSURE TIME AND OPERATING METHOD THEREFOR

(71) Applicant: PixArt Imaging Inc., Hsin-Chu County (TW)

(72) Inventors: Guo-Zhen Wang, Hsin-Chu County (TW); Shiaw-Yu Jou, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 433 days.

(21) Appl. No.: 16/012,982

(22) Filed: Jun. 20, 2018

(65) Prior Publication Data

US 2018/0302545 A1   Oct. 18, 2018

Related U.S. Application Data

(63) Continuation of application No. 14/962,214, filed on Dec. 8, 2015, now Pat. No. 10,033,937.

(30) Foreign Application Priority Data

Jan. 13, 2015   (TW) .............................. 104101160 A

(51) Int. Cl.
| | | |
|---|---|---|
| H04N 5/235 | (2006.01) |
| G01C 3/08 | (2006.01) |
| H04N 5/225 | (2006.01) |
| H04N 5/232 | (2006.01) |
| G01S 7/4912 | (2020.01) |
| G01S 7/486 | (2020.01) |

(52) U.S. Cl.
CPC ............. *H04N 5/2353* (2013.01); *G01C 3/08* (2013.01); *H04N 5/2256* (2013.01); *H04N 5/2356* (2013.01); *H04N 5/23229* (2013.01); *G01S 7/4868* (2013.01); *G01S 7/4918* (2013.01); *G06T 2207/20021* (2013.01); *G06T 2207/20216* (2013.01)

(58) Field of Classification Search
CPC ............. H04N 5/2256; H04N 5/23229; H04N 5/2356; G06T 2207/20021; G06T 2207/20216; G01S 7/4868; G01S 7/4918
See application file for complete search history.

(56) References Cited

U.S. PATENT DOCUMENTS

| | | | | |
|---|---|---|---|---|
| 9,204,843 B2 * | 12/2015 | Gu | ........................ | A61B 5/6886 |
| 2013/0155057 A1 * | 6/2013 | Wang | .................. | G06F 3/03542 |
| | | | | 345/419 |
| 2014/0028873 A1 * | 1/2014 | Higuchi | ............... | H04N 5/2352 |
| | | | | 348/229.1 |

(Continued)

FOREIGN PATENT DOCUMENTS

| | | |
|---|---|---|
| CN | 102291538 A | 12/2011 |
| CN | 103793106 A | 5/2014 |

*Primary Examiner* — Eric L Bolda
(74) *Attorney, Agent, or Firm* — WPAT, PC

(57) ABSTRACT

There is provided an optical distance measurement system including an image sensor and a processing unit. The processing unit is configured to generate an image to be calculated according to at least one image captured by the image sensor, wherein different image regions of the image to be calculated correspond to different exposure times thereby improving the accuracy of the distance calculation.

17 Claims, 8 Drawing Sheets

(56) References Cited

U.S. PATENT DOCUMENTS

| | | |
|---|---|---|
| 2014/0111482 A1 | 4/2014 | Kao et al. |
| 2014/0313369 A1* | 10/2014 | Kageyama ............... H04N 9/68 348/223.1 |
| 2016/0073033 A1* | 3/2016 | Ogasawara ........... A63F 13/213 348/207.1 |
| 2016/0123723 A1* | 5/2016 | Wang ..................... G01B 11/14 348/135 |
| 2017/0180622 A1* | 6/2017 | Zabatani ............... F16K 31/363 |

* cited by examiner

OPTICAL MEASUREMENT SYSTEM WITH DYNAMIC EXPOSURE TIME AND OPERATING METHOD THEREFOR

CROSS REFERENCE TO RELATED APPLICATION

This application is a continuation application of U.S. application Ser. No. 14/962,214, filed on Dec. 8, 2015, which is based on and claims the priority benefit of Taiwan Patent Application Serial Number 104101160, filed on Jan. 13, 2015, the full disclosure of which is incorporated herein by reference.

BACKGROUND

1. Field of the Disclosure

This disclosure generally relates to a distance measurement system and, more particularly, to an optical distance measurement system with dynamic exposure times.

2. Description of the Related Art

An optical distance measurement system is able to calculate an object distance by triangulation. For example, the optical distance measurement system includes a light source and a camera. The light source emits light to an object to be detected, and the camera receives reflected light from the object to be detected so as to generate an image frame. When a spatial relationship between the light source and the camera is known, a distance of the object to be detected is obtainable by triangulation according to a position of an object image in the image frame.

However, when several objects to be detected having different distances exist in the operating space, the object to be detected having a close distance may be over-exposed whereas the object to be detected having a far distance may be under-exposed such that the calculation accuracy of the optical distance measurement system is degraded. Especially, when an object to be detected having a far distance is under-exposed, a distance of the object to be detected at a far distance may not be obtainable.

SUMMARY

Accordingly, the present disclosure further provides an optical distance measurement system capable of reserving information of both far and close objects to be detected in the image frame so as to increase the calculation accuracy.

The present disclosure provides an optical distance measurement system employing time-multiplexing.

The present disclosure provides an optical distance measurement system employing time-multiplexing and capable of reducing the power consumption.

The present disclosure provides an operating method for an optical measurement system. The optical measurement system has an image sensor. The operating method includes the steps of: entering an idle mode and entering an operating mode. The idle mode includes the steps of: capturing, by the image sensor, a reference dark image with a reference exposure time; maintaining the idle mode when no object image is in the reference dark image; and entering the operating mode when an object image is in the reference dark image. The operating mode includes alternatively capturing, by the image sensor, a first image with a first exposure time and a second image with a second exposure time.

The present disclosure provides an optical measurement system including a light source, an image sensor and a processing unit. The light source is configured to emit light at an operating frequency. The image sensor is configured to capture, with a first exposure time, a first bright image when the light source is turned on, capture, with the first exposure time, a first dark image when the light source is turned off, capture, with a second exposure time, a second bright image when the light source is turned on, and capture, with the second exposure time, a second dark image when the light source is turned off. The processing unit is configured to receive the first bright image, the first dark image, the second bright image and the second dark image, keep the first exposure time being fixed; and adjust the second exposure time according to an average brightness value of the second dark image.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
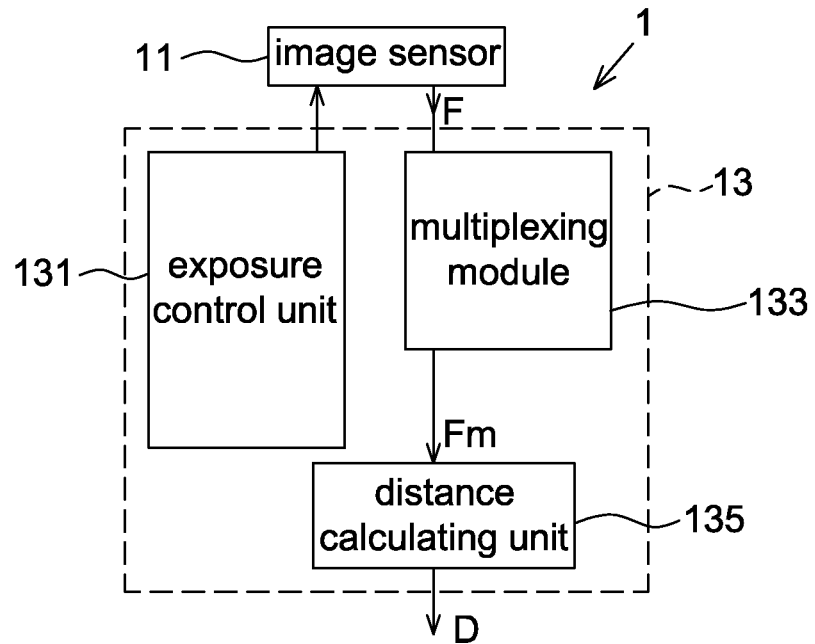
FIG. 1 is a schematic block diagram of an optical distance measurement system according to one embodiment of the present disclosure.

Referring to FIG. 1, it is a schematic block diagram of an optical distance measurement system according to one embodiment of the present disclosure. The optical distance measurement system 1 includes an image sensor 11 and a processing unit 13. The image sensor 11 is preferably an active image sensor, e.g. a complementary metal oxide semiconductor (CMOS) image sensor, but not limited thereto. An exposure time of the image sensor 11 for capturing an image F is changeable.

The processing unit 13 is, for example, a digital signal processor (DSP), a microcontroller (MCU), a central processing unit (CPU), an application specific integrated circuit (ASIC) or the like. The processing unit 13 receives the image F outputted by the image sensor 11 for post-processing, and controls the image capturing of the image sensor 11. In some embodiments, the processing unit 13 includes an exposure control unit 131, a multiplexing module 133 and a distance calculating unit 135, wherein the exposure control unit 131, the multiplexing module 133 and the distance calculating unit 135 are data processing modules in the processing unit 13 and implemented by software and/or hardware without particular limitations. It is appreciated that although FIG. 1 shows that, for illustration purpose, the processing unit 13 is divided into different working modules, operations performed by every working module in the processing unit 13 are considered to be executed by the processing unit 13.

The exposure control unit 131 controls the image sensor 11 to capture all image regions of different images F with different exposure times (e.g. one image corresponding to one exposure time). The multiplexing module 133 processes, using time-multiplexing, the image F received by the processing unit 13 to generate an image to be calculated Fm (e.g. the combined image mentioned below). The distance calculating unit 135 calculates, by a predetermined algorithm, at least one object distance according to the image to be calculated Fm, e.g. calculating the object distance using triangulation.

Figure 2:
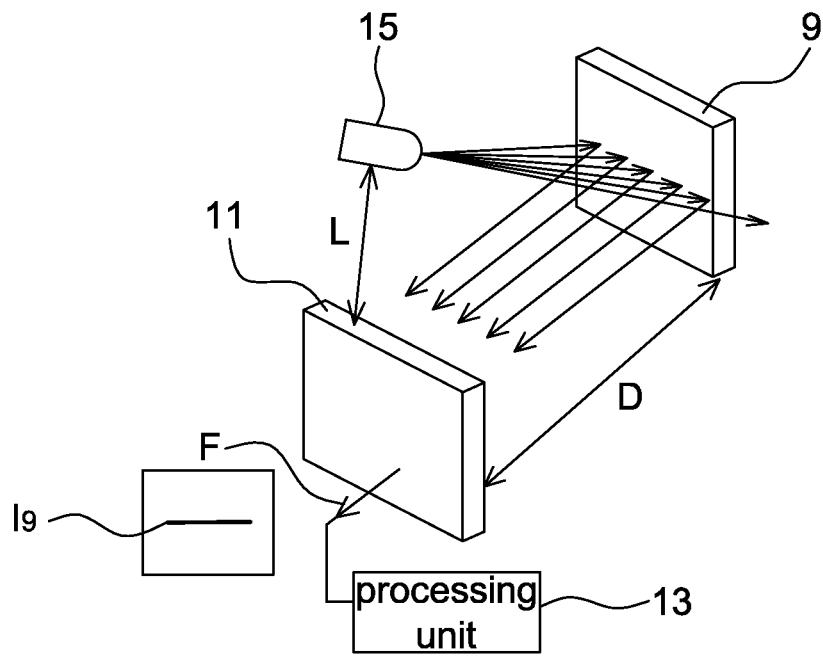
FIG. 2 is a schematic diagram of an optical distance measurement system according to one embodiment of the present disclosure.

Referring to FIG. 2, it is a schematic diagram of an optical distance measurement system according to one embodiment of the present disclosure. The optical distance measurement system 1 further includes a light source 15 configured to emit a two-dimensional light section (e.g. an optical line with a predetermined width) to an object to be detected 9, wherein the light source 15 is selected from a coherent light, a partially coherent light or non-coherent light without particular limitations. The light source 15 emits light of an identifiable spectrum, e.g. visible light or invisible light. It should be mentioned that although FIG. 2 shows that the light source 15 projects a non-continuous two-dimensional light section, it is only intended to illustrate but not to limit the present disclosure. The light source 15 is able to project the two-dimensional light section in a scanning manner or directly projects a two-dimensional light section.

The image sensor 11 receives reflected light from the object to be detected 9 and then generates an image F containing a reflection light image I9 to be sent to the processing unit 13. The image sensor 11 includes, for example, a pixel matrix which is formed by arranging a plurality of pixels. The image F is referred to matrix information of gray values outputted by the plurality of pixels.

The processing unit 13 firstly generates an image to be calculated Fm according to the image F using the multiplexing mechanism (illustrated below by examples) of the present disclosure, and then calculates at least one object distance D according to the image to be calculated Fm, wherein the image to be calculated Fm also includes a reflection light image I9. More specifically speaking, at least a part of a plurality of exposure times corresponding to different image regions of the image to be calculated Fm is different from each other (illustrated below by examples) to allow the brightness of the reflection light image I9 in each image region to be suitable to calculate the at least one object distance D. In addition, in some embodiments, the processing unit 13 outputs, in a wired or wireless manner, the image to be calculated Fm to an external device for post-processing, e.g. to an external host.

In one embodiment, the processing unit 13 includes a memory unit (not shown) configured to store a lookup table which includes the relationship between positions of the reflection light image I9 and object distances D. Accordingly, after the processing unit 13 obtains the position of the reflection light image I9 in the image to be calculated Fm, the at least one object distance D is obtainable by checking the lookup table, wherein the lookup table is constructed according to the spatial relationship between the light source 15 and the image sensor 11 (e.g. the distance L) and an illumination angle of the light source 15, and is previously stored in the memory unit. In another embodiment, the memory unit of the processing unit 13 stores a distance calculation algorithm rather than a lookup table, and after the position of the reflection light image I9 in the image to be calculated Fm is obtained, the at least one object distance D is calculated through the distance calculation algorithm.

In the present disclosure, as the light source 15 is configured to project a two-dimensional light section, the image F outputted by the image sensor 11 contains a linear reflection image I9, and the processing unit 13 calculates a plurality of object distances at the same time (e.g. different objects to be detected corresponding to different parts of the reflection light section and at different positions) to have better adaptability. Finally, the processing unit 13 outputs the at least one object distance D being calculated to perform corresponding controls, e.g. outputting to a host or a computer system, wherein control functions corresponding to the object distance D are determined according different applications.

Figure 3:
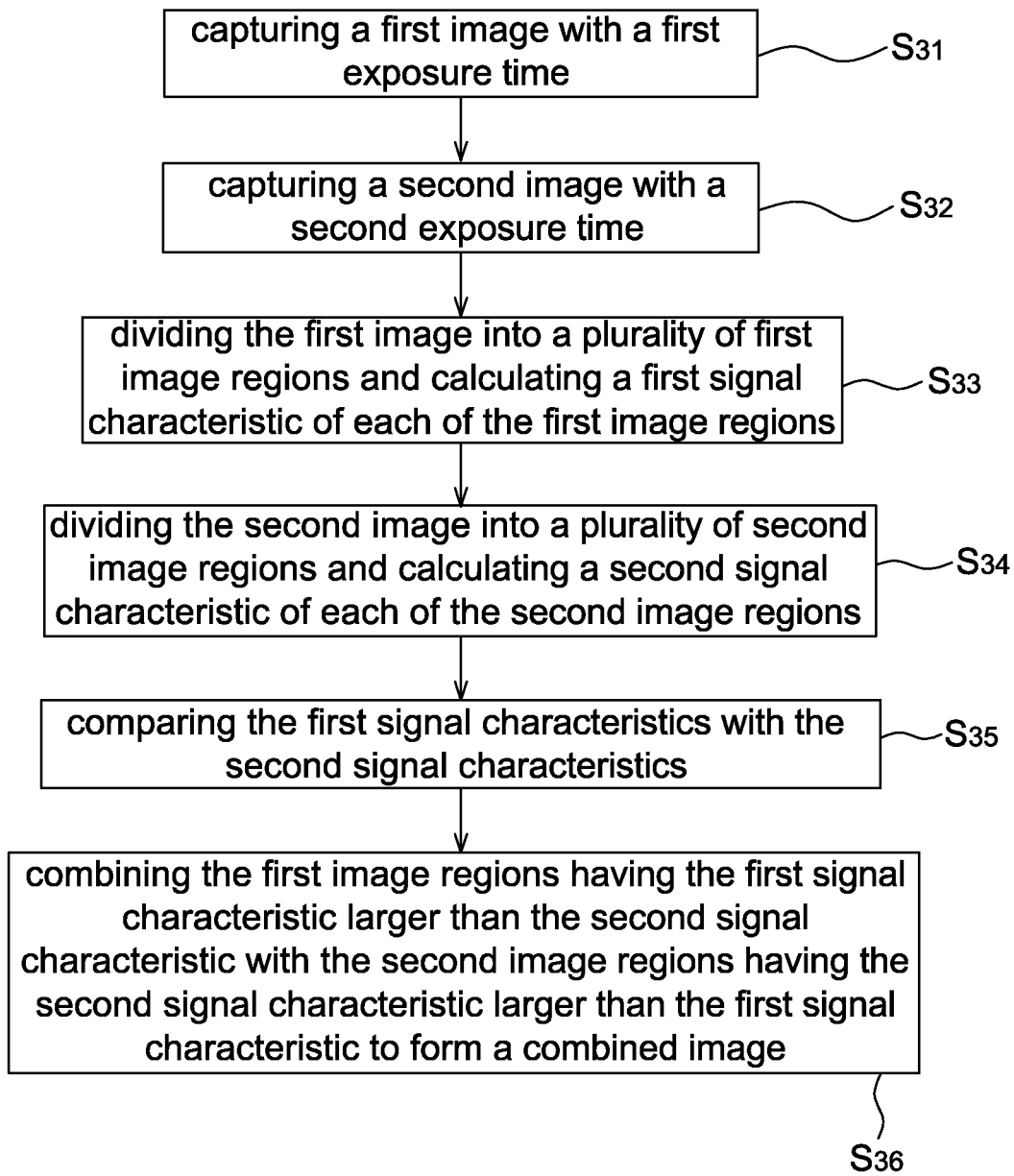
FIG. 3 is a flow chart of a distance measurement method of an optical distance measurement system according to a first embodiment of the present disclosure.

Referring to FIG. 3, it is a flow chart of a distance measurement method of an optical distance measurement system according to a first embodiment of the present disclosure, which includes the steps of: capturing a first image with a first exposure time (Step S31); capturing a second image with a second exposure time (Step S32); dividing the first image into a plurality of first image regions and calculating a first signal characteristic of each of the first image regions (Step S33); dividing the second image into a plurality of second image regions and calculating a second signal characteristic of each of the second image regions (Step S34); comparing the first signal characteristics with the second signal characteristics (Step S35); and combining the first image regions having the first signal characteristic larger than the second signal characteristic with the second image regions having the second signal characteristic larger than the first signal characteristic to form a combined image (Step S36).

Referring FIGS. 1-3 and 4A-4B, details of the first embodiment of the present disclosure are illustrated hereinafter. In one embodiment, the processing unit 13 controls the light source 15 to emit light when the image sensor 11 is capturing the image F to allow the image F captured by the image sensor 11 to contain the reflection light image I9 associated with the object to be detected 9 so as to be able to calculate an object distance D of the object to be detected 9.

Step S31: The image sensor 11 is controlled by the exposure control unit 131 of the processing unit 13 to capture a first image $F_L$ with a first exposure time $ET_L$.

Figure 4A:
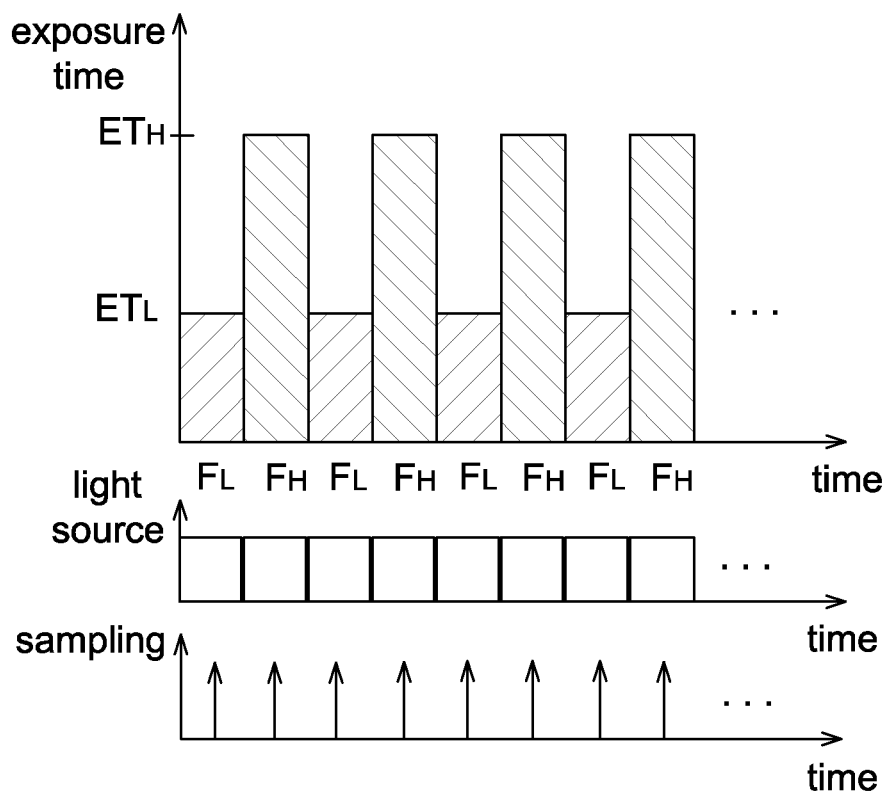
FIG. 4A is an operational schematic diagram of an optical distance measurement system according to a first embodiment of the present disclosure.

Step S32: Next, the image sensor 11 is controlled by the processing unit 13 (or the exposure control unit 131) to capture a second image $F_H$ with a second exposure time $ET_H$, wherein the first image $F_L$ and the second image $F_H$ are two images F successively or separated by at least one image captured by the image sensor 11. The first exposure time $ET_L$ is different from the second exposure time $ET_H$. The at least one image separating the first image $F_L$ and the second image $F_H$ is, for example, a dark image (i.e. captured when the light source 15 is not lighted) which is subtracted from the first image $F_L$ and the second image $F_H$ for eliminating ambient light. It should be mentioned that although FIG. 4A shows that the first exposure time $ET_L$ is shorter than the second exposure time $ET_H$, the present disclosure is not limited thereto. In one embodiment, the processing unit 13 controls the image sensor 11 to alternatively capture images with the first exposure time $ET_L$ and the second exposure time $ET_H$.

Step S33: After the processing unit 13 receives the first image $F_L$, the multiplexing module 133 divides, by a predetermined method, the first image $F_L$ into a plurality of first image regions, e.g. A1 to A4 (shown in FIG. 4B), and calculates a first signal characteristic C1 to C4 (shown in FIG. 4B) of each of the first image regions A1 to A4, wherein each of the first image regions A1 to A4 is, for example, one pixel row, a plurality of pixel rows, one pixel column, a plurality of pixel columns or a rectangular pixel region, and is not limited to that shown in FIG. 4B. In one embodiment, the signal characteristics C1 to C4 are respectively signal-to-noise ratios (SNR) of the first image regions A1 to A4. For example, the multiplexing module 133 separates signal data and noise data according to a dynamic threshold in each of the first image regions A1 to A4, and calculates the SNR according to the signal data and the noise data, e.g. calculating a ratio between an energy sum of all signal data with respect to an energy sum of all noise data in each of the first image regions A1 to A4 to be served as the SNR. In one embodiment, the dynamic threshold is selected as, for example, an average value of a maximum energy value in one first image region divided by an average energy sum of the first image region, but not limited to, and thus one threshold is obtained corresponding to each of the first image regions A1 to A4. As the threshold of each of the first image regions A1 to A4 is calculated according to current image data being captured, it is possible that the thresholds are different from each other and thus the thresholds are referred to dynamic thresholds herein.

Step S34: Similarly, after the processing unit 13 receives the second image $F_H$, the multiplexing module 133 divides, by the predetermined method (as the Step S33), the second image $F_H$ into a plurality of second image regions, e.g. A1' to A4' (shown in FIG. 4B), and calculates a second signal characteristic C1' to C4' (shown in FIG. 4B) of each of the second image regions A1' to A4', wherein each of the second image regions A1' to A4' is, for example, one pixel row, a plurality of pixel rows, one pixel column, a plurality of pixel columns or a rectangular pixel region, and is not limited to that shown in FIG. 4B. Similarly, the signal characteristics C1' to C4' are respectively signal-to-noise ratios (SNR) of the second image regions A1' to A4'. For example, the multiplexing module 133 separates signal data from noise data according to a dynamic threshold in each of the second image regions A1' to A4', and calculates the SNR according to the signal data and the noise data, e.g. calculating a ratio between an energy sum of all signal data with respect to an energy sum of all noise data in one second image region to be served as the SNR. The method of determining the dynamic threshold is similar to that of Step S33 and thus details thereof are not repeated herein.

Step S35: Next, the multiplexing module 133 compares the signal characteristics of corresponded (i.e. image region-by-image region) first image regions A1-A4 and second image regions A1'-A4', e.g., comparing the first signal characteristic C1 of the first image region A1 with the second signal characteristic C1' of the second image region A1'; comparing the first signal characteristic C2 of the first image region A2 with the second signal characteristic C2' of the second image region A2'; comparing the first signal characteristic C3 of the first image region A3 with the second signal characteristic C3' of the second image region A3'; and comparing the first signal characteristic C4 of the first image region A4 with the second signal characteristic C4' of the second image region A4'.

Step S36: Next, The multiplexing module 133 combines, using a time-multiplexing mechanism, a part of image regions of the first image $F_L$ (e.g. an image captured earlier herein) with a part of image regions of the second image $F_H$ (e.g. an image captured later herein) to generate a combined image which is configured as an image to be calculated Fm. In one embodiment, the multiplexing module 133 combines the first image regions having a larger signal characteristic with the second image regions having a larger signal characteristic to form a combined image. For example, it is assumed that the first signal characteristics C1 and C4 are respectively larger than the second signal characteristics C1' and C4'. This means that the first image regions A1 and A4 are more suitable to calculate a correct object distance compared to the second image regions A1' and A4'. And it is assumed that the first signal characteristics C2 and C3 are smaller than the second signal characteristics C2' and C3', respectively. This means that the second image regions A2' and A3' are more suitable to calculate a correct object distance compared to the first image regions A2 and A3. The multiplexing module 133 recombines a combined image (i.e. the image to be calculated Fm) which includes the image regions A1, A2', A3' and A4 as shown in FIG. 4B.

Figure 4B:
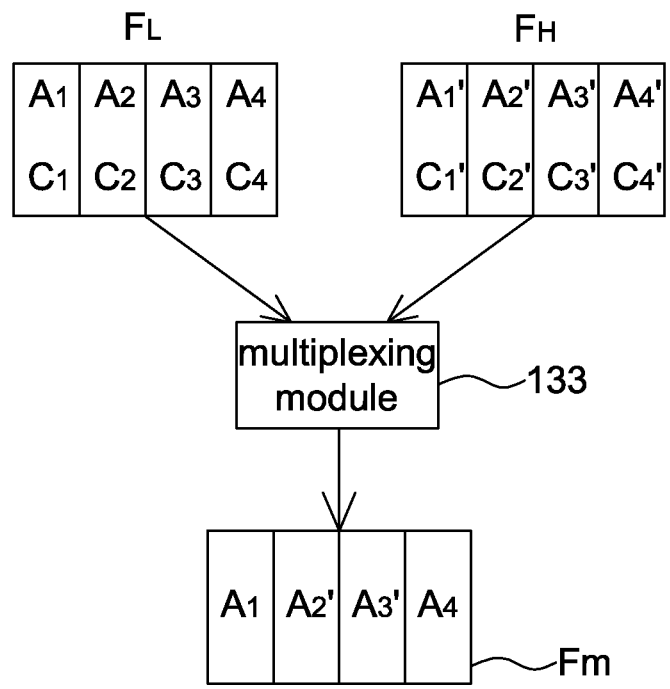
FIG. 4B is another operational schematic diagram of an optical distance measurement system according to a first embodiment of the present disclosure.

It is appreciated that although FIG. 4B shows that a combined image Fm respectively includes a part of image regions (e.g. A1 and A4) of the first image $F_L$ and a part of image regions (e.g. A2' and A3') of the second image $F_H$, the present disclosure is not limited thereto. According to the image F actually captured by the image sensor 11, the combined image is possibly identical to the first image $F_L$ or the second image $F_H$. In addition, it should be mentioned that the Step S32 in FIG. 3 is not limited to be prior to the Step S33, and it is possible that the Step S32 is subsequent to the Step S33 and prior to the Step S34.

Finally, the distance calculating unit 135 of the processing unit 13 calculates at least one object distance D according to the combined image Fm. It should be mentioned that, a number of the at least one object distance in the present disclosure is determined, for example, according to a number of pixel columns of the combined image Fm, e.g. obtaining one object distance corresponding to each pixel column or obtaining one object distance corresponding to every a plurality of pixel rows (e.g. 2 to 5 columns) depending on the identification resolution. The distance calculating unit 135 also identifies a number of objects to be detected according to a plurality of object distances being obtained, and merges the object distances associated with a same object to be detected to a same object distance associated with the same object to be detected. Accordingly, the distance calculating unit 135 finally outputs a same number of object distances D as a number of objects to be detected.

In addition, although FIGS. 4A and 4B show that the processing unit 13 compares signal characteristics of different image regions of two images $F_L$ and $F_H$ so as to generate a combined image Fm, the present disclosure is not limited thereto. In some embodiments, it is possible for the processing unit 13 to compare signal characteristics of different image regions of more than two images F and generate a combined image. In this case, it is only need to select the image region having the maximum signal characteristic in corresponded image regions of more than two images in the Step S36 so as to generate the combined image Fm, and operations of other Steps S31-S35 are similar to the above first embodiment as long as at least one image F captured with a different exposure time is added in the process, and thus details thereof are not repeated herein. In other words, the multiplexing module 133 of this embodiment divides every image F captured by the image sensor 11 into a plurality of corresponded identical image regions (e.g. identical positions and sizes) such that the combined image Fm has an identical size to the image F. In addition, it is possible that said combined image Fm is a selected window of interest of the image F, e.g. including only a part of pixels of the image F.

In a word, in the first embodiment, the processing unit 13 recombines different image regions of different image frames to a new combined image according to the image quality of the different image regions so as to calculate at least one object distance D according to the combined image, wherein shapes and sizes of said different image regions do not have particular limitations. For example, the processing unit 13 recombines a part of image regions, e.g. a part of A1 to A4, in the first image $F_L$ with a part of image regions, a part of A1' to A4', in the second image $F_H$ to form a combined image Fm according to the image quality (e.g. signal characteristics).

In addition, to further eliminate the influence from ambient light, the processing unit 13 further controls the light source 15 to activate and deactivate at an operating frequency corresponding to the image capturing of the image sensor 11, e.g. capturing a bright image corresponding the activation of the light source 15 and capturing a dark image corresponding to the deactivation of the light source 15. The processing unit 13 further calculates a differential image between the bright image and the dark image to be served the first image $F_L$ and the second image $F_H$ in the above first embodiment. That is, in the above first embodiment, the first image $F_L$ is a first differential image and the second image $F_H$ is a second differential image.

In some embodiments, as the variation of ambient light and the different of object reflectivity can change the detectable dynamic range and in order to broaden the detectable dynamic range of the optical distance detection system 1 of the present disclosure, it is able to further change the first exposure time $ET_L$ and the second exposure time $ET_H$.

Figure 5:
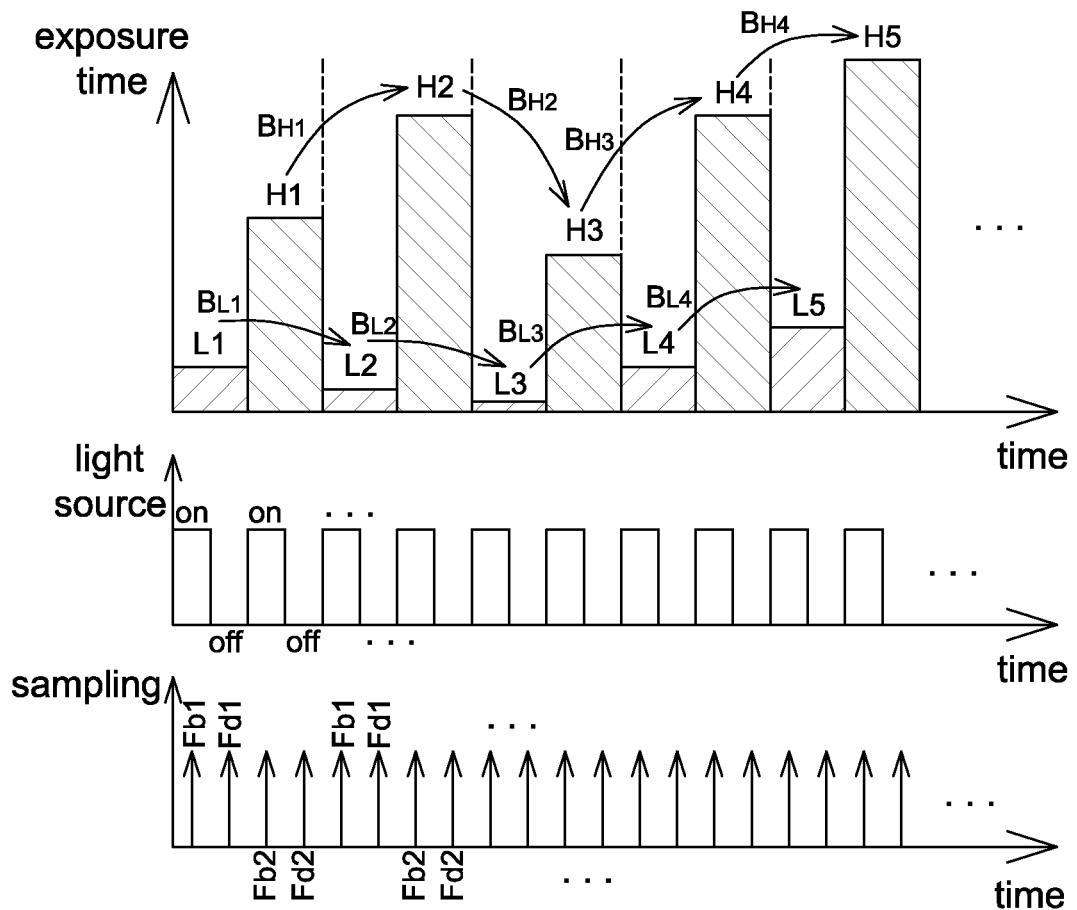
FIG. 5 is an operational schematic diagram of an optical distance measurement system according to a second embodiment of the present disclosure.

Referring to FIG. 5, it is an operational schematic diagram of an optical distance measurement system according to a second embodiment of the present disclosure. In the second embodiment, the optical distance measurement system also includes the image sensor 11, the processing unit 13 and the light source 15 as shown in FIGS. 1-2. The difference between this embodiment and the above first embodiment is that in the first embodiment, the first exposure time $ET_L$ and the second exposure time $ET_H$ are fixed, whereas in the second embodiment, the first exposure time (e.g. shown as L1 to L5) and the second exposure time (e.g. shown as H1 to H5) are adjustable, or the first exposure times are fixed and the second exposure times are adjustable, wherein the second exposure time is also shown to be longer than the first exposure time.

In this embodiment, the differential image is taken as an example for illustration. As mentioned above, the differential image used in this embodiment is applicable to the first image $F_L$ and the second image $F_H$ in the above first embodiment.

As shown in FIG. 5, the light source 15 emits light at an operating frequency. The image sensor 11 captures first bright images $F_{b1}$ with first exposure times (e.g. shown as L1 to L5) corresponding to on-states of the light source 15, and captures first dark images $F_{d1}$ with the first exposure times corresponding to off-states of the light source 15. The image sensor 11 captures second bright images $F_{b2}$ with second exposure times (e.g. shown as H1 to H5) corresponding to on-states of the light source 15, and captures second dark images $F_{d2}$ with the second exposure times corresponding to off-states of the light source 15. Similar to the above first embodiment, the processing unit 13 is configured to receive the first bright image $F_{b1}$, the first dark image $F_{d1}$, the second bright image $F_{b2}$ and the second dark image $F_{d2}$, to calculate a first different image between the first bright image $F_{b1}$ and the first dark image $F_{d1}$, to calculate a second different image between the second bright image $F_{b2}$ and the second dark image $F_{d2}$, to divide the first differential image into a plurality of first image regions (e.g. A1 to A4 shown in FIG. 4B), to divide the second differential image into a plurality of second image regions (e.g. A1' to A4' shown in FIG. 4B), to compare signal characteristics of the corresponded first image regions and second image regions, and to combine the first image regions having a larger signal characteristic with the second image regions having a larger signal characteristic to form a combined image. In this embodiment, in addition to further calculate the first differential image and the second differential, other processes are similar to the above first embodiment and thus details thereof are not repeated herein. In one embodiment, the differential image is obtained by subtracting a dark image from a bright image in a pixel-by-pixel manner.

In the second embodiment, the exposure time is adjusted by two aspects.

In a first aspect, the processing unit 13, for example, calculates a first average brightness value of the first dark image $F_{d1}$ and calculates a second average brightness value of the second dark image $F_{d2}$. As mentioned above, one of objects of the second embodiment is to eliminate the influence from ambient light through adjusting exposure time. Therefore, the ambient light is evaluated through the average brightness of the dark image (i.e. captured when the light source being turned off). The processing unit 13 then adjusts the first exposure time (e.g. L1 to L5 shown in FIG. 5) according to a first average brightness value (e.g. $B_{L1}$ to $B_{L4}$ shown in FIG. 5) of the first dart image $F_{d1}$, and adjusts the second exposure time (e.g. H1 to H5 shown in FIG. 5) according to a second average brightness value (e.g. $B_{H1}$ to $B_{H4}$ shown in FIG. 5) of the second dart image $F_{d2}$.

For example in FIG. 5, the processing unit 13 adjusts the first exposure time from L1 to L2 according to a first average brightness value $B_{L1}$ of the first dark image $F_{d1}$, adjusts the first exposure time from L2 to L3 according to a first average brightness value $B_{L2}$ of the first dark image $F_{d1}$, and so on. The processing unit 13 adjusts the second exposure time from H1 to H2 according to a second average brightness value $B_{H1}$ of the second dark image $F_{d2}$, adjusts the second exposure time from H2 to H3 according to a second average brightness value $B_{H2}$ of the second dark image $F_{d2}$, and so on. It should be mentioned that although FIG. 5 shows that the first exposure time and the second exposure time are adjusted every time, it is only intended to illustrate but not to limit the present disclosure. According to the image F actually being captured, it is possible that the first exposure time and the second exposure are not adjusted.

Figure 6:
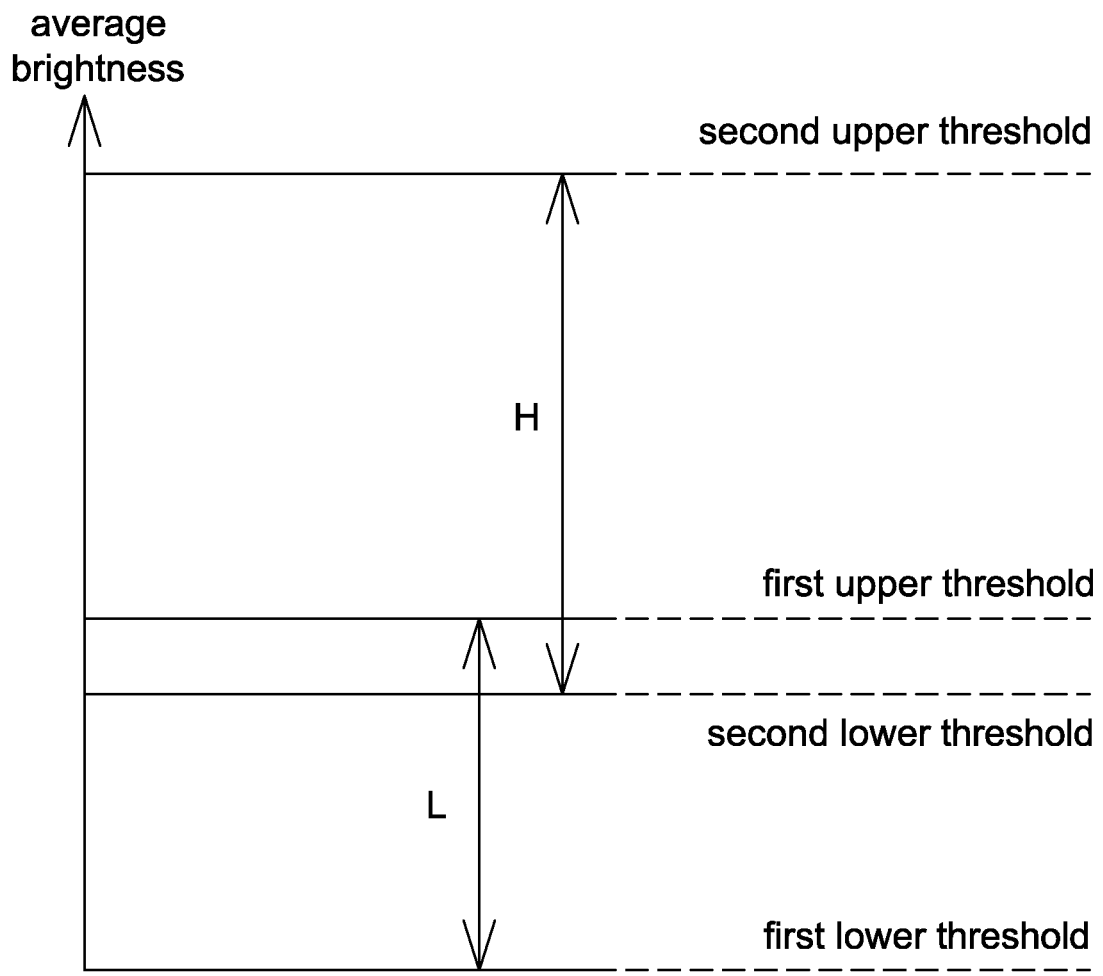
FIG. 6 is a schematic diagram of setting thresholds of the optical distance measurement system according to the second embodiment of the present disclosure.

Referring to FIG. 6, it is a schematic diagram of setting thresholds of the optical distance measurement system according to the second embodiment of the present disclosure. The processing unit 11 compares the first average brightness value (e.g. $B_{L1}$ to $B_{L4}$) with a first upper threshold and a first lower threshold to adjust the first exposure time (e.g. L1 to L5), wherein when the first average brightness value is larger than the first upper threshold, the first exposure time for capturing a next image is decreased, whereas when the first average brightness value is smaller than the first lower threshold, the first exposure time for capturing a next image is increased, or the first exposure time is unchanged. The processing unit 11 compares the second average brightness value (e.g. $B_{H1}$ to $B_{H4}$) with a second upper threshold and a second lower threshold to adjust the second exposure time (e.g. H1 to H5), wherein when the second average brightness value is larger than the second upper threshold, the second exposure time for capturing a next image is decreased, whereas when the second average brightness value is smaller than the second lower threshold, the second exposure time for capturing a next image is increased, or the second exposure time is unchanged. In one embodiment, the first upper threshold is set to be larger than the second lower threshold so as to avoid the frequent adjustment when the average brightness of the dark image is close to the threshold.

In another aspect, the processing unit 13 adjusts the second exposure time (e.g. H1 to H5) according to an object image size in the second dark image $F_{d2}$.

Figure 7:
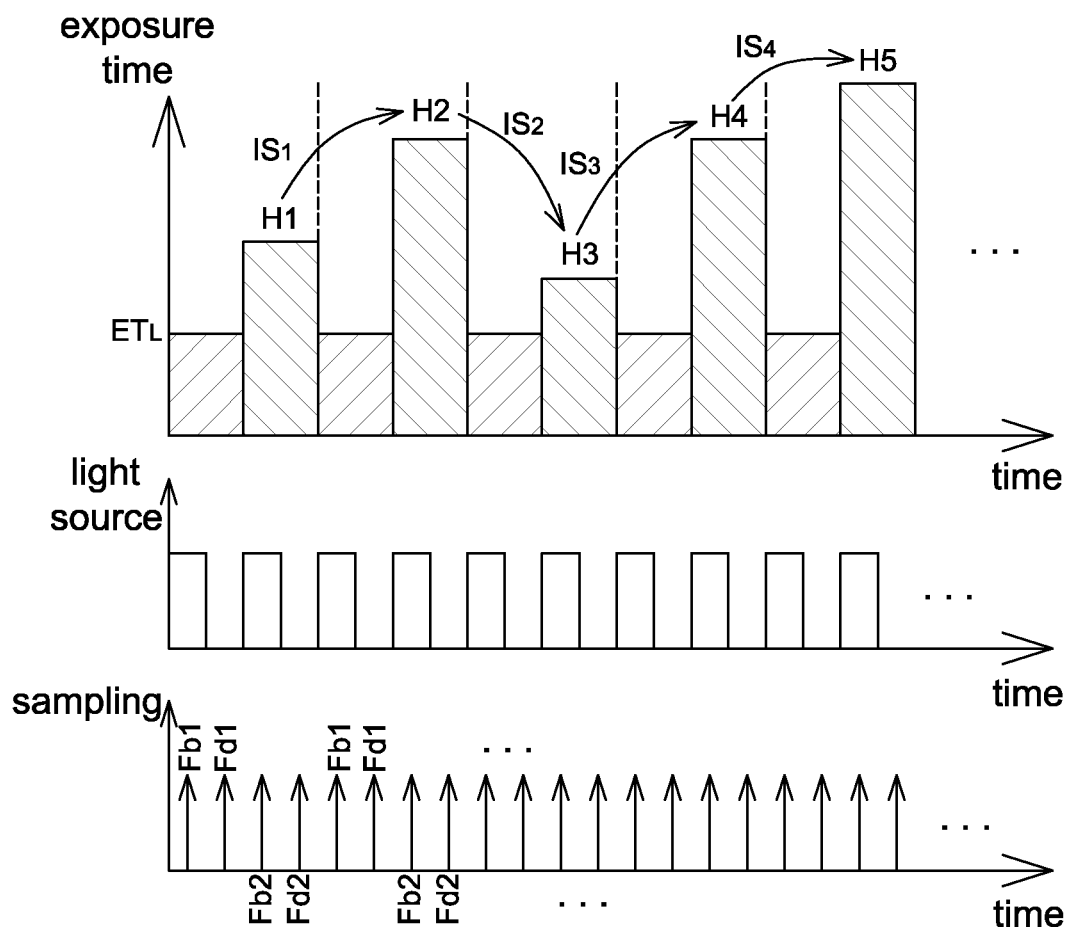
FIG. 7 is another operational schematic diagram of an optical distance measurement system according to a second embodiment of the present disclosure.

For example referring to FIG. 7, the processing unit 13 adjusts the second exposure time from H1 to H2 according to an object image size $IS_1$ in the second dark image $F_{d2}$, adjusts the second exposure time from H2 to H3 according to an object image size $IS_2$ in the second dark image $F_{d2}$, and so on. In this embodiment, the first exposure times (e.g. L1 to L5) are not changed. Similarly, although FIG. 7 shows that the second exposure time is adjusted every time, it is only intended to illustrate but not to limit the present disclosure. According to the image F actually being captured, it is possible that the second exposure time is not adjusted.

Figure 8:
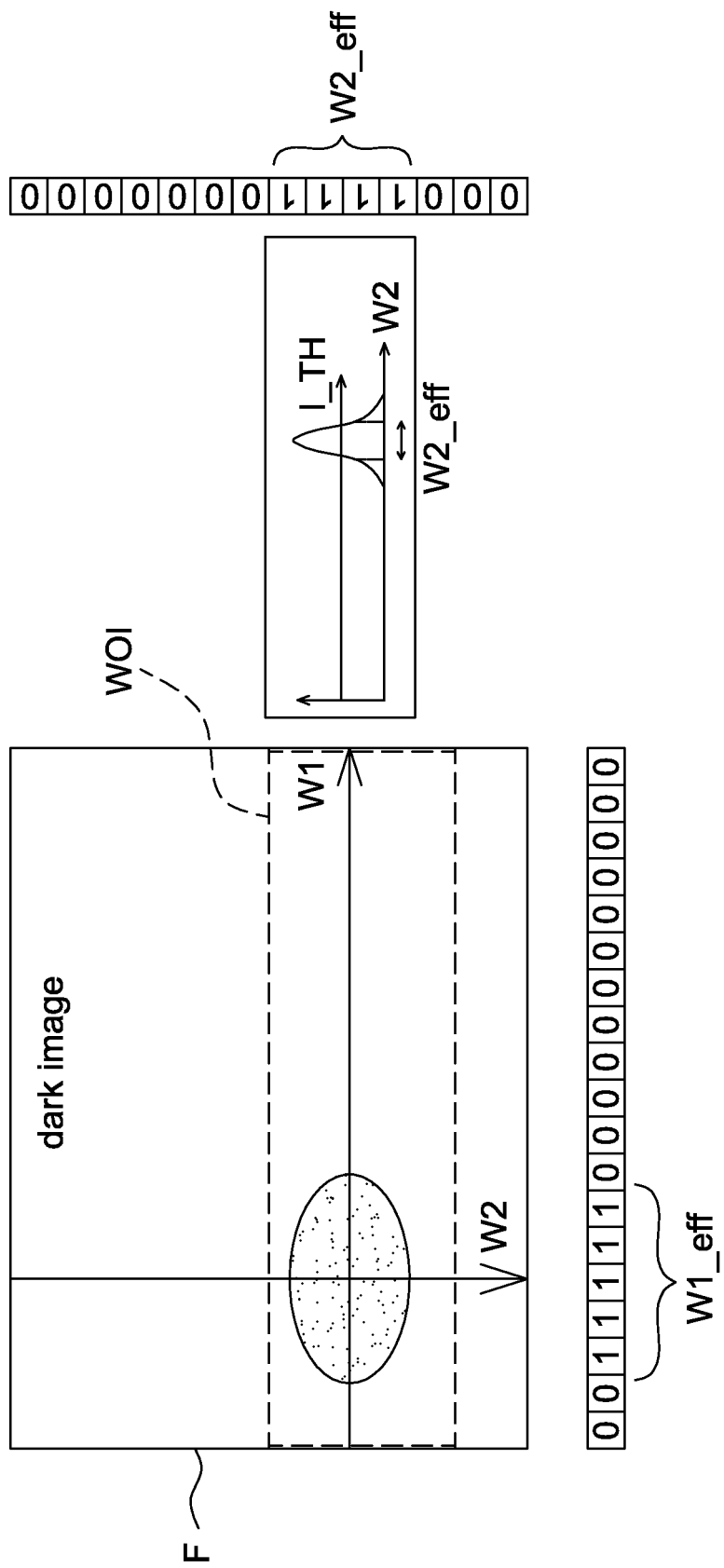
FIG. 8 is a schematic diagram of determining an object image size of the optical distance measurement system according to the second embodiment of the present disclosure.

Referring to FIG. 8, it is a schematic diagram of determining an object image size of the optical distance measurement system according to the second embodiment of the present disclosure. In this aspect, said object image size is a two-dimensional size, i.e. pixel numbers of an object image; or said object image size is a one-dimensional size, e.g. the width W1 and/or height W2 of an object image. In FIG. 8, it is able to set a pixel in a pixel series to a digital value "1" when a gray value thereof is larger than a gray value threshold I_TH, and set a pixel in the pixel series to a digital value "0" when a gray value thereof is smaller than the gray value threshold I_TH so as to calculate an effective width W1_eff and/or an effective height W2_eff of an object image to be served as the object image size. In addition, for saving resources, it is possible not to process data of the whole dark image F but only process pixel data within a window of interest WOI and ignore pixel data outside the WOI, wherein a range of the WOI is determined according to a position that the object image could appear in actual measurement.

In this aspect, the processing unit 13 decreases the second exposure time (e.g. H1 to H5) when the object image size is larger than an upper threshold, whereas increases the second exposure time (e.g. H1 to H5) when the object image size is smaller than a lower threshold.

Figure 9A:
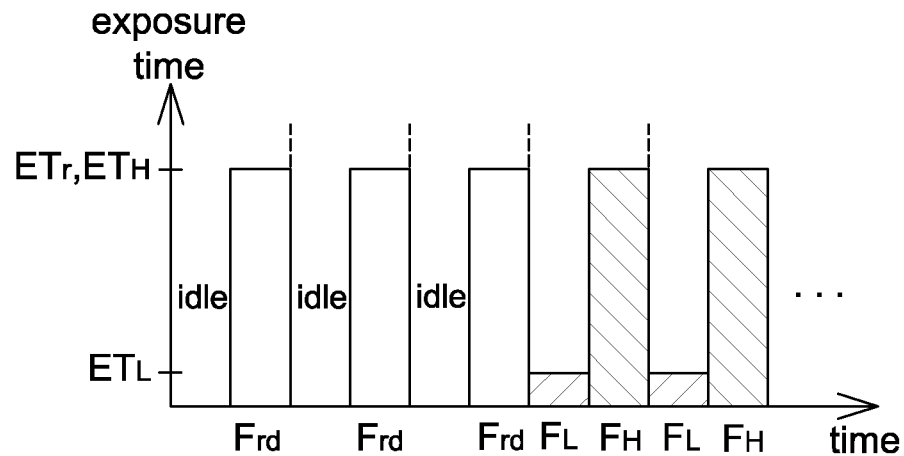
FIGS. 9A-9B are operational schematic diagrams of an optical distance measurement system according to a third embodiment of the present disclosure.
Figure 9B:
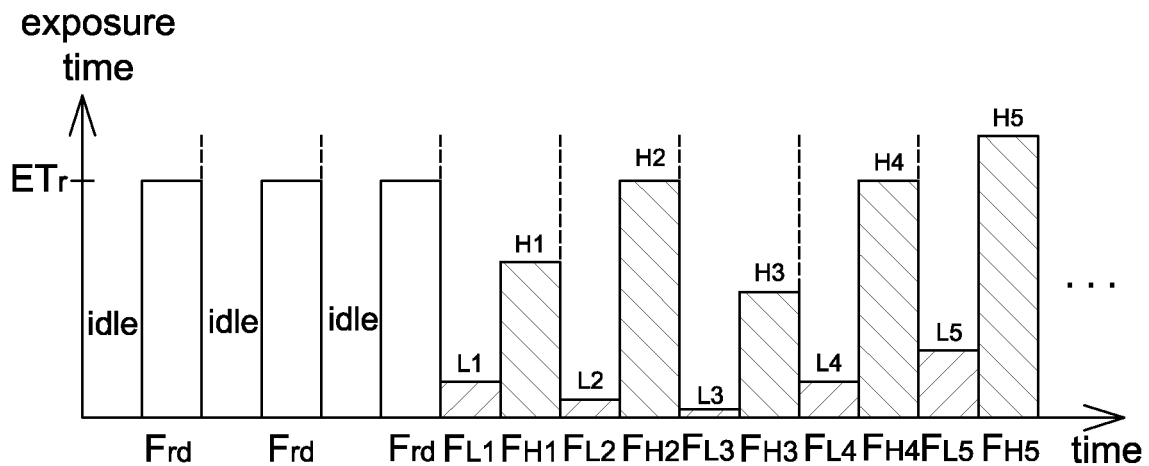

Referring to FIGS. 9A and 9B, they are operational schematic diagrams of an optical distance measurement system according to a third embodiment of the present disclosure. Compared to conventional techniques, the above first and second embodiments are configured to recombine an image to be calculated Fm using two images F captured by different exposure times, and thus have a higher frame rate. The third embodiment is for saving power and resources of the system and is applicable to the above first and second embodiments.

In this embodiment, the optical distance measurement system also includes the image sensor 11, the processing unit 13 and the light source 15 as shown in FIGS. 1-2.

The image sensor 11 captures a reference dark image Frd (e.g. captured when the light source is turned off) with a reference exposure time ETr, captures a first image $F_L$ with a first exposure time $ET_L$ and captures a second image $F_H$ with a second exposure time $ET_H$, wherein the reference dark image Frd is for determining whether the operating mode of the above first embodiment or the second embodiment is entered. As mentioned above, it is possible that the first image $F_L$ and the second image $F_H$ are differential images so as to eliminate the influence of ambient light. In one embodiment, the reference exposure time ETr is identical to the second exposure time $ET_H$, as shown in FIG. 9A. In another embodiment, the reference exposure time ETr is not identical to the second exposure times H1 to H5 as shown in FIG. 9B.

The processing unit 13 is configured to control the image sensor 11 to alternatively capture the first image $F_L$ with the first exposure time $ET_L$ and capture the second image $F_H$ with the second exposure time $ET_H$ when the reference dark image Frd is identified containing an object image; whereas when the reference dark image Frd is identified not containing any object image, the processing unit 13 is configured to control the image sensor 11 to capture another reference dark image Rrd with the reference exposure time ETr to perform the identification again. More specifically speaking, when the processing unit 13 identifies that an object appears according to the reference dark image Frd captured with the reference exposure time ETr (e.g. the second exposure time $ET_H$), the optical distance measurement method of the above first embodiment or the second embodiment is entered, otherwise the optical distance measurement system 1 enters an idle mode, wherein the method of identifying whether an image includes an object is known to the art, e.g. identifying whether there is a predetermined number of pixel values larger than a predetermined threshold, and thus details thereof are not described herein.

In addition, said idle mode herein is referred to at least one of turning off the light source, stopping capturing images with the first exposure time (e.g. short exposure time), not combining an image to be calculated according to two images F, not calculating an object distance, so as to save power and resources of the system.

For example as shown in FIG. 9A, when the third embodiment is applied to the first embodiment and after an idle mode is left to enter an operating mode (e.g. as shown in FIG. 4A), if the processing unit 13 identifies that there is no object image (e.g. the object leaving a field of view of the image sensor 11) according to the second dark image (i.e. the image captured with the second exposure time $ET_H$ corresponding to the deactivation of the light source 15), the optical distance measurement system 1 enters the idle mode again.

For example as shown in FIG. 9B, when the third embodiment is applied to the second embodiment and after an idle mode is left to enter an operating mode (e.g. as shown in FIG. 5), if the processing unit 13 identifies that there is no object image (e.g. the object leaving a field of view of the image sensor 11) according to the second dark image (e.g. $F_{d2}$), the optical distance measurement system 1 enters the idle mode again.

In the above embodiments, the multiplexing module 133 of the processing unit 13 divides a plurality of images F and calculates signal characteristics, e.g. SNR or average brightness, of different image regions (e.g. shown in FIG. 4B) so as to output an image to be calculated Fm for the distance calculating unit 135 to calculate at least one object distance D. In the first embodiment, the exposure control unit 131 controls the image sensor 11 to capture different images (e.g. $F_L$ and $F_H$) with predetermined exposure times, and the exposure times for capturing different images by the image sensor 11 is controlled as predetermined fixed values ($ET_L$, $ET_H$ shown in FIG. 4A) by the exposure control unit 131. In the second embodiment, the exposure control unit 131 controls the image sensor 11 to capture different images (e.g. $F_{b1}$, $F_{d1}$, $F_{b2}$, $F_{d2}$) with a short exposure time (e.g. L1 to L5) and a long exposure time (e.g. H1 to H5), which are variable values, so as to increase the detectable dynamic range. In the third embodiment, when a reference dark image Frd captured with a reference exposure time ETr does not contain an object image, the optical distance measurement system 1 enters an idle mode. Or when a dark image captured with a long exposure time (e.g. the second exposure time $ET_H$ or $H_1$ to $H_5$) in an operating mode does not contain an object image, the optical distance measurement system 1 enters the idle mode again so as to save power and resources of the system.

As mentioned above, the conventional optical distance measurement system has the problem of unable to accurately detect distances of a plurality of objects to be detected at different positions. Especially, the distance of the object to be detected at a far distance may not be obtainable. Therefore, the present disclosure further provides an optical distance measurement system (FIGS. 1 and 2) and an optical distance measurement method (FIGS. 4A-4B, 5, 7 and 9A-9B) that reserve image information of objects at different distances by time-multiplexing so as to improve the calculation accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An operating method for an optical measurement system, the optical measurement system comprises an image sensor, the operating method comprising:
    entering an idle mode, the idle mode comprising:
        capturing, by the image sensor, a reference dark image with a reference exposure time;
        maintaining the idle mode when no object image is in the reference dark image; and
        entering an operating mode when an object image is in the reference dark image, wherein
    the operating mode comprises:
        alternatively capturing, by the image sensor, a first image with a first exposure time and a second image with a second exposure time.

2. The operating method as claimed in claim 1, wherein the first exposure time and the second exposure time are fixed, and
    the second exposure time is longer than the first exposure time.

3. The operating method as claimed in claim 2, wherein the reference exposure time is identical to the second exposure time.

4. The operating method as claimed in claim 1, wherein in the idle mode, the image sensor does not capture any image in a first time interval and the image sensor captures the reference dark image in a second time interval,
    the first time interval corresponds to a time interval for capturing the first image, and
    the second time interval corresponds to a time interval for capturing the second image.

5. The operating method as claimed in claim 1, wherein the second exposure time is adjustable, and
    the second exposure time is longer than the first exposure time.

6. The operating method as claimed in claim 5, wherein the optical measurement system further comprises a light source, and the operating method further comprises:
    capturing, by the image sensor, a first bright image with the first exposure time when the light source is turned on;
    capturing, by the image sensor, a first dark image with the first exposure time when the light source is turned off;
    calculating a first differential image between the first bright image and the first dark image configured as the first image;
    capturing, by the image sensor, a second bright image with the second exposure time when the light source is turned on;
    capturing, by the image sensor, a second dark image with the second exposure time when the light source is turned off; and
    calculating a second differential image between the second bright image and the second dark image configured as the second image.

7. The operating method as claimed in claim 6, further comprising:
    adjusting the second exposure time according to an average brightness value of the second dark image.

8. The operating method as claimed in claim 6, further comprising:
    adjusting the second exposure time according to an object image size in the second dark image.

9. The operating method as claimed in claim 1, wherein the operating mode further comprises:
    dividing the first image into a plurality of first image regions and calculating a first signal characteristic of each of the first image regions,
    dividing the second image into a plurality of second image regions and calculating a second signal characteristic of each of the second image regions,
    comparing the first signal characteristic of each of the first image regions with the second signal characteristic of the corresponded second image region, and
    combining the first image region having the first signal characteristic larger than the second signal characteristic of the corresponded second image region with the second image region having the second signal characteristic larger than the first signal characteristic of the corresponded first image region to form a combined image.

10. The operating method as claimed in claim 9, wherein the operating mode further comprises:
   calculating at least one object distance according to the combined image.

11. The operating method as claimed in claim 9, wherein
   each of the first image regions is one pixel row, a plurality of pixel rows, one pixel column, a plurality of pixel columns or a rectangular pixel region of the first image, and
   each of the second image regions is one pixel row, a plurality of pixel rows, one pixel column, a plurality of pixel columns or a rectangular pixel region of the second image.

12. The operating method as claimed in claim 9, wherein
   in the first and second image regions, a dynamic threshold is selected to separate signal data and noise data, and
   the signal data and the noise data are for calculating a signal-to-noise ratio which is configured as the first and second signal characteristics.

13. The operating method as claimed in claim 1, wherein the optical measurement system further comprises a light source, and the operating method further comprises:
   turning off the light source in the idle mode.

14. The operating method as claimed in claim 1, wherein the operating mode further comprises:
   returning to the idle mode when the second image does not contain any object image.

15. An optical measurement system, comprising:
   a light source configured to emit light at an operating frequency;
   an image sensor configured to
      capture, with a first exposure time, a first bright image when the light source is turned on,
      capture, with the first exposure time, a first dark image when the light source is turned off,
      capture, with a second exposure time, a second bright image when the light source is turned on, and
      capture, with the second exposure time, a second dark image when the light source is turned off; and
   a processing unit configured to
      receive the first bright image, the first dark image, the second bright image and the second dark image,
      keep the first exposure time being fixed; and
      adjust the second exposure time according to an average brightness value of the second dark image.

16. The optical measurement system as claimed in claim 15, wherein the processing unit is further configured to
   calculate a first differential image between the first bright image and the first dark image,
   calculate a second differential image between the second bright image and the second dark image,
   divide the first differential image into a plurality of first image regions,
   divide the second differential image into a plurality of second image regions,
   compare signal characteristics of the first image regions with the corresponded second image regions, and
   combine the first image regions having larger signal characteristics than the corresponded second image regions with the second image regions having larger signal characteristics than the corresponded first image regions to form a combined image.

17. The optical measurement system as claimed in claim 16, wherein the processing unit is further configured to calculate at least one object distance according to the combined image.

* * * * *